(12) United States Patent
Wu

(10) Patent No.: US 10,925,055 B2
(45) Date of Patent: Feb. 16, 2021

(54) DEVICE AND METHOD OF HANDLING CHANNEL ACCESS PROCEDURE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 103 days.

(21) Appl. No.: 15/965,986

(22) Filed: Apr. 30, 2018

(65) Prior Publication Data

US 2018/0317228 A1 Nov. 1, 2018

Related U.S. Application Data

(60) Provisional application No. 62/492,939, filed on May 1, 2017.

(51) Int. Cl.
| | | |
|---|---|---|
| *H04W 4/00* | (2018.01) | |
| *H04W 72/04* | (2009.01) | |
| *H04W 16/14* | (2009.01) | |
| *H04W 72/08* | (2009.01) | |
| *H04W 74/08* | (2009.01) | |
| *H04W 74/00* | (2009.01) | |

(52) U.S. Cl.
CPC ....... *H04W 72/0453* (2013.01); *H04W 16/14* (2013.01); *H04W 72/042* (2013.01); *H04W 72/048* (2013.01); *H04W 72/0413* (2013.01); *H04W 72/085* (2013.01); *H04W 74/0808* (2013.01); *H04W 74/002* (2013.01)

(58) Field of Classification Search
CPC ............. H04W 72/0453; H04W 16/14; H04W 72/0413; H04W 72/042; H04W 72/048; H04W 72/085; H04W 74/0808; H04W 74/002
See application file for complete search history.

(56) References Cited

U.S. PATENT DOCUMENTS

| | | | | |
|---|---|---|---|---|
| 6,418,137 | B1 * | 7/2002 | Bontu | H04W 52/362 370/332 |
| 9,609,566 | B2 * | 3/2017 | Himayat | H04W 36/22 |
| 10,257,855 | B2 * | 4/2019 | Babaei | H04W 74/0808 |
| 10,356,671 | B2 * | 7/2019 | Park | H04W 16/14 |
| 10,863,396 | B2 * | 12/2020 | Park | H04W 74/0808 |
| 2014/0029570 | A1 * | 1/2014 | Lee | H04W 36/0005 370/331 |

(Continued)

FOREIGN PATENT DOCUMENTS

| | | |
|---|---|---|
| CN | 106233763 A | 12/2016 |
| CN | 106470502 A | 3/2017 |

(Continued)

OTHER PUBLICATIONS

Search Report dated Sep. 3, 2018 for EP application No. 18170116.0, pp. 1-5.

(Continued)

*Primary Examiner* — Stephen M D Agosta
(74) *Attorney, Agent, or Firm* — Winston Hsu

(57) ABSTRACT

The present invention provides a method and a communication device for handling channel access procedures. The communication device knows how to perform channel access procedures after receiving radio resource control (RRC) messages with or without a maximum energy detection threshold.

11 Claims, 4 Drawing Sheets

(56) References Cited

U.S. PATENT DOCUMENTS

| | | | |
|---|---|---|---|
| 2016/0086571 A1* | 3/2016 | Aoki | G09G 5/34 345/593 |
| 2016/0227578 A1* | 8/2016 | Lee | H04W 74/004 |
| 2016/0270100 A1 | 9/2016 | Ng | |
| 2016/0286579 A1 | 9/2016 | Park | |
| 2016/0309334 A1 | 10/2016 | Bhorkar | |
| 2017/0099678 A1 | 4/2017 | Dinan | |
| 2017/0290059 A1* | 10/2017 | Karaki | H04W 74/0816 |
| 2018/0242364 A1* | 8/2018 | Park | H04W 74/00 |

FOREIGN PATENT DOCUMENTS

| | | |
|---|---|---|
| WO | 2016/089019 A1 | 6/2016 |
| WO | 2017/026981 A1 | 2/2017 |

OTHER PUBLICATIONS

"14 UE procedures related to Sidelink", 3GPP TS 36.213 V14.1.0(Dec. 2016), Release 14, France, Dec. 2016, XP051250481, pp. 352-408.

3GPP TS 36.331 V14.2.0 (Mar. 2017) Technical Specification 3rd Generation Partnership Project; Technical Specification Group Radio Access Network; Evolved Universal Terrestrial Radio Access (E-UTRA); Radio Resource Control (RRC); Protocol specification (Release 14).

3GPP TS 36.213 V14.2.0 (Mar. 2017); 3rd Generation Partnership Project; Technical Specification Group Radio Access Network; Evolved Universal Terrestrial Radio Access (E-UTRA); Physical layer procedures (Release 14), pp. 1-7, pp. 385-441.

3GPP TS 36.331 V14.2.2 (Apr. 2017); 3rd Generation Partnership Project; Technical Specification Group Radio Access Network; Evolved Universal Terrestrial Radio Access (E-UTRA); Radio Resource Control (RRC); Protocol specification (Release 14).

Office action dated Nov. 22, 2018 for the Taiwan application No. 107114675, filing date Apr. 30, 2018, pp. 1-19.

Office action dated Jan. 3, 2020 for the China application No. 201810410878.0, filing date May 2, 2018, p. 1-10.

* cited by examiner

US 10,925,055 B2

DEVICE AND METHOD OF HANDLING CHANNEL ACCESS PROCEDURE

CROSS REFERENCE TO RELATED APPLICATIONS

This application claims the benefits of U.S. Provisional Applications No. 62/492,939 filed on May 1, 2017, which is incorporated herein by reference.

BACKGROUND OF THE INVENTION

1. Field of the Invention

The present invention relates to a device and a method used in a wireless communication system, and more particularly, to a device and a method of handling a channel access procedure.

2. Description of the Prior Art

A user equipment (UE) performs a channel access procedure, before initiating a transmission on an unlicensed carrier of a cell.

SUMMARY OF THE INVENTION

The present invention therefore provides a method and related communication device for handling a channel access procedure to solve the abovementioned problem.

A communication device for handling a channel access procedure comprises a storage device, and a processing circuit coupled to the storage device. The storage device stores, and the processing circuit is configured to execute instructions of receiving a first radio resource control (RRC) message on a RRC connection from a base station (BS), wherein the first RRC message comprises a first configuration indicating a first absolute maximum energy detection threshold value for an uplink unlicensed access (UA) on a UA cell; performing a first channel access procedure according to the first absolute maximum energy detection threshold value; receiving a second RRC message on the RRC connection from the BS, after receiving the first RRC message, wherein the second RRC message does not comprise any absolute maximum energy detection threshold value for the UL UA on the UA cell; and performing a second channel access procedure according to the first absolute maximum energy detection threshold value, after receiving the second RRC message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
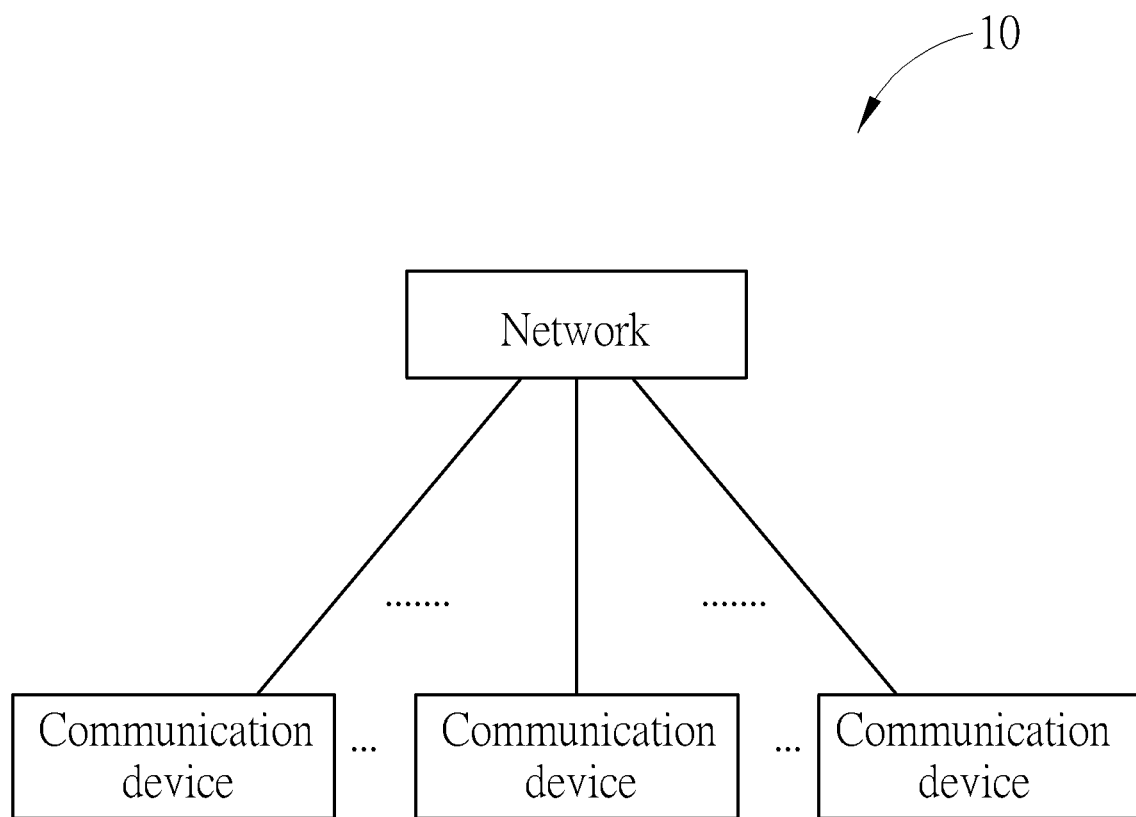
FIG. 1 is a schematic diagram of a wireless communication system according to an example of the present invention.

In FIG. 1, the wireless communication system 10 is briefly composed of a network and a plurality of communication devices. The network and a communication device may communicate with each other via one or more carriers of licensed band (s) and/or unlicensed band (s). The network and the communication device may communicate with each other via one or multiple cells (e.g., multiple carriers) including a primary cell (PCell), zero, one or more secondary cells (SCells), and zero or one primary SCell (PSCell). The abovementioned cells may be operated in the same or different frame structure types, or in the same or different duplexing modes, e.g., frequency-division duplexing (FDD) or time-division duplexing (TDD) in the same radio access technology (RAT) or different RATs. The RATs may include evolved universal terrestrial radio access (EUTRA) or 5G (or called New Radio (NR)). For example, the PCell may be operated on a licensed carrier, while the PSCell or the SCell may be operated on an unlicensed carrier, i.e., licensed-assisted access (LAA). In one example, the PCell may be operated on an unlicensed carrier without any licensed carrier, i.e., standalone unlicensed access (UA).

The network may include at least one base station (BS) to communicate with the communication devices. Practically, the at least one BS may include at least one evolved Node-B (eNB) or at least one 5G BS (e.g., gNB). In general, a BS may also be used to refer any of the eNB and the 5G BS.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
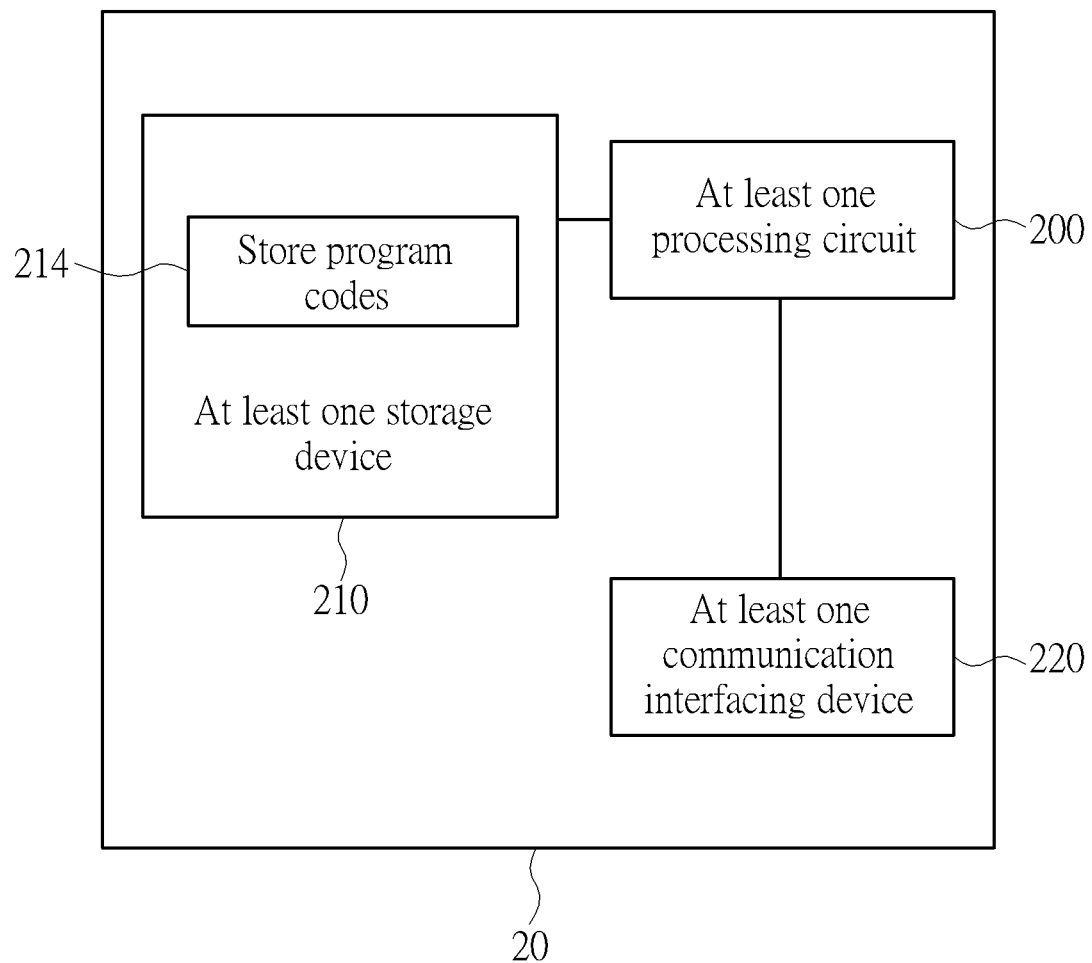
FIG. 2 is a schematic diagram of a communication device according to an example of the present invention.

In FIG. 2, the communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

According to the prior art, a BS needs to transmit an "absolute maximum energy detection threshold" (i.e., max-EnergyDetectionThreshold information element (IE)/field) value for a UL UA to a UE, if the BS does not want the UE to use a default maximum energy detection threshold for the UL UA. The UA may include the LAA or the standalone UA. For example, the BS transmits a first radio resource control (RRC) message (e.g., RRCConnectionReconfiguration) including the maxEnergyDetectionThreshold configuring a maximum energy detection threshold. Later, the BS transmits a second RRC message (e.g., RRCConnectionReconfiguration) to configure (or reconfigure) configuration(s) (e.g., measurement configuration, medium access control (MAC) configuration or radio link control (RLC) configuration) nothing to do with a LAA configuration. The BS has to include the maxEnergyDetectionThreshold in the second RRC message to avoid that the UE uses the default maximum energy detection. If the maxEnergyDetectionThreshold is absent in a RRC message, the UE uses the default maximum energy detection threshold value.

Figure 3:
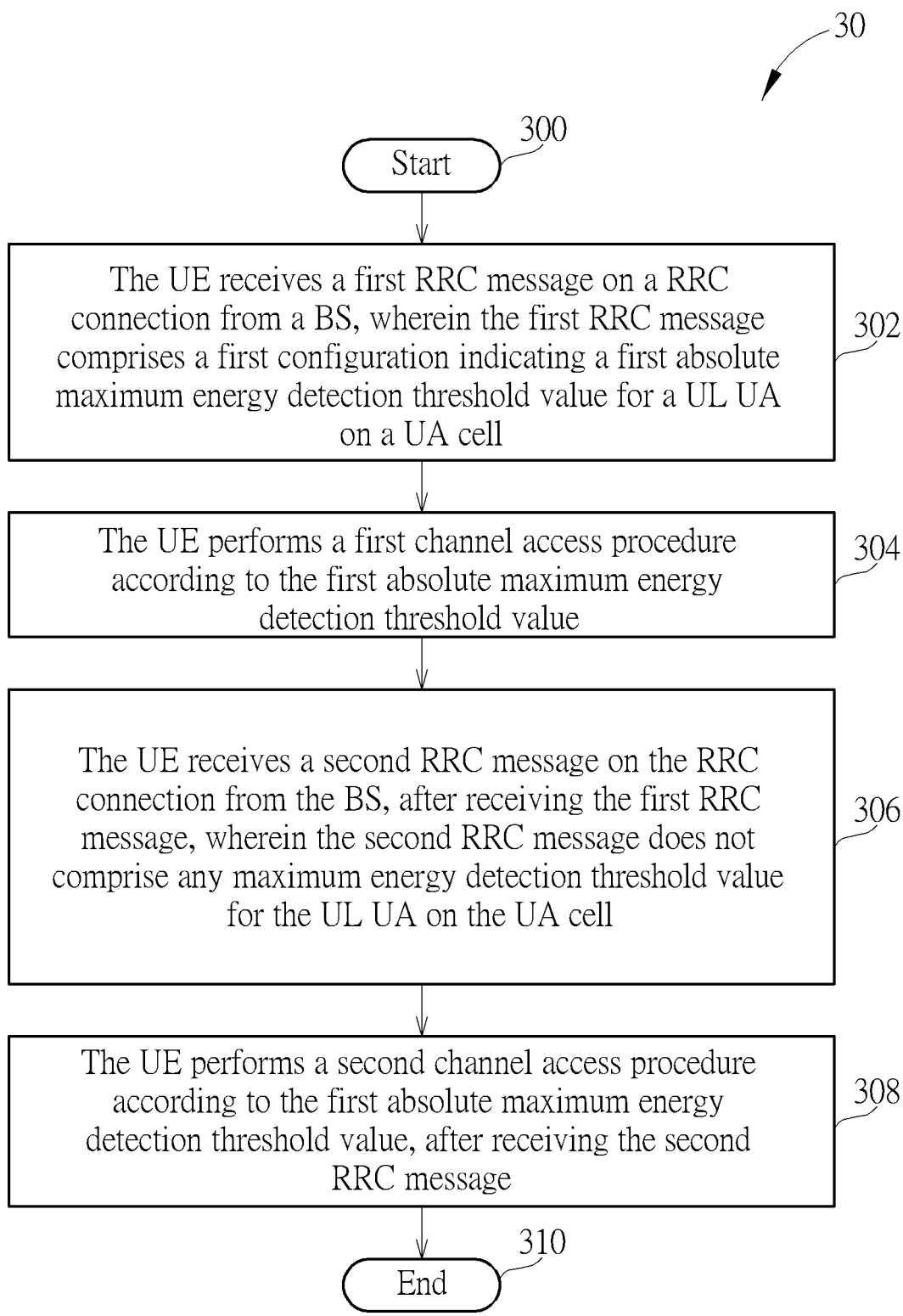
FIG. 3 is a flowchart of a process according to an example of the present invention.

A process 30 in FIG. 3 is utilized in a UE, and includes the following steps:

Step 300: Start.

Step 302: The UE receives a first RRC message on a RRC connection from a BS, wherein the first RRC message comprises a first configuration indicating a first absolute maximum energy detection threshold value for a UL UA on a UA cell.

Step 304: The UE performs a first channel access procedure according to the first absolute maximum energy detection threshold value.

Step 306: The UE receives a second RRC message on the RRC connection from the BS, after receiving the first RRC message, wherein the second RRC message does not comprise any maximum energy detection threshold value for the UL UA on the UA cell.

Step 308: The UE performs a second channel access procedure according to the first absolute maximum energy detection threshold value, after receiving the second RRC message.

Step 310: End.

In one example, the UE receives the first RRC message on a PCell or a SCell of the BS. In one example, the first RRC message configures the UL UA, and includes the first configuration. In one example, the first configuration comprises the first absolute maximum energy detection threshold value.

In one example, the second RRC message neither comprises any absolute maximum energy detection threshold value nor comprises an offset to a default energy detection threshold value for the UL UA on the UA cell. In one example, the second RRC message comprises a second configuration different from the first configuration. For example, the second configuration is a physical layer configuration for a licensed carrier, a MAC configuration, a RLC configuration, a Packet Data Convergence Protocol (PDCP) configuration, a measurement configuration or a wireless local area network (WLAN) configuration.

In one example, the UE receives a third RRC message from the BS or another BS on the RRC connection, after receiving the second RRC message. The third RRC message may comprise a third configuration indicating a second absolute maximum energy detection threshold value or indicating an offset to a default maximum energy detection threshold value (e.g., in an energyDetectionThresholdOffset field/IE). Then, the UE does not use the first absolute maximum energy detection threshold value (e.g., release the first configuration), in response to the third RRC message. Instead, the UE performs a third channel access procedure according to the second absolute maximum energy detection threshold value or the offset to the default maximum energy detection threshold value.

According to the process 30, the UE keeps (or maintains or continues) using the first absolute maximum energy detection threshold value for the UL UA on the UA cell in response to the second RRC message after the second RRC message, until receiving the second absolute maximum energy detection threshold value or the offset to the default maximum energy detection threshold value.

In one example, the UE establishes the RRC connection to the BS on a PCell by using a first licensed carrier by performing a RRC connection establishment procedure, a RRC connection resume procedure or a handover procedure. The UE receives the RRC message (e.g., the first/second/third RRC message) from the PCell on the first licensed carrier. The UE transmits a RRC response message for the RRC message to the BS on the PCell by using the first licensed carrier or on a second licensed carrier of the PCell.

In one example, the UE performs the first channel access procedure on an unlicensed carrier of the UA cell, when the UE intends to transmit a first transmission on the unlicensed carrier. When the UE senses that the unlicensed carrier is idle according to the first channel access procedure, the UE may perform the first transmission. The UE performs the second channel access procedure on the unlicensed carrier of the UA cell, when the UE intends to transmit a second transmission on the unlicensed carrier. When the UE senses that the unlicensed carrier is idle according to the second channel access procedure, the UE may perform the second transmission.

According to the process 30, the BS does not always include the absolute maximum energy detection threshold value in every RRC message transmitted to the UE, if the BS does not intend to change the absolute maximum energy detection threshold value. This saves bit(s) in the RRC message. Accordingly, radio resource is saved.

Figure 4:
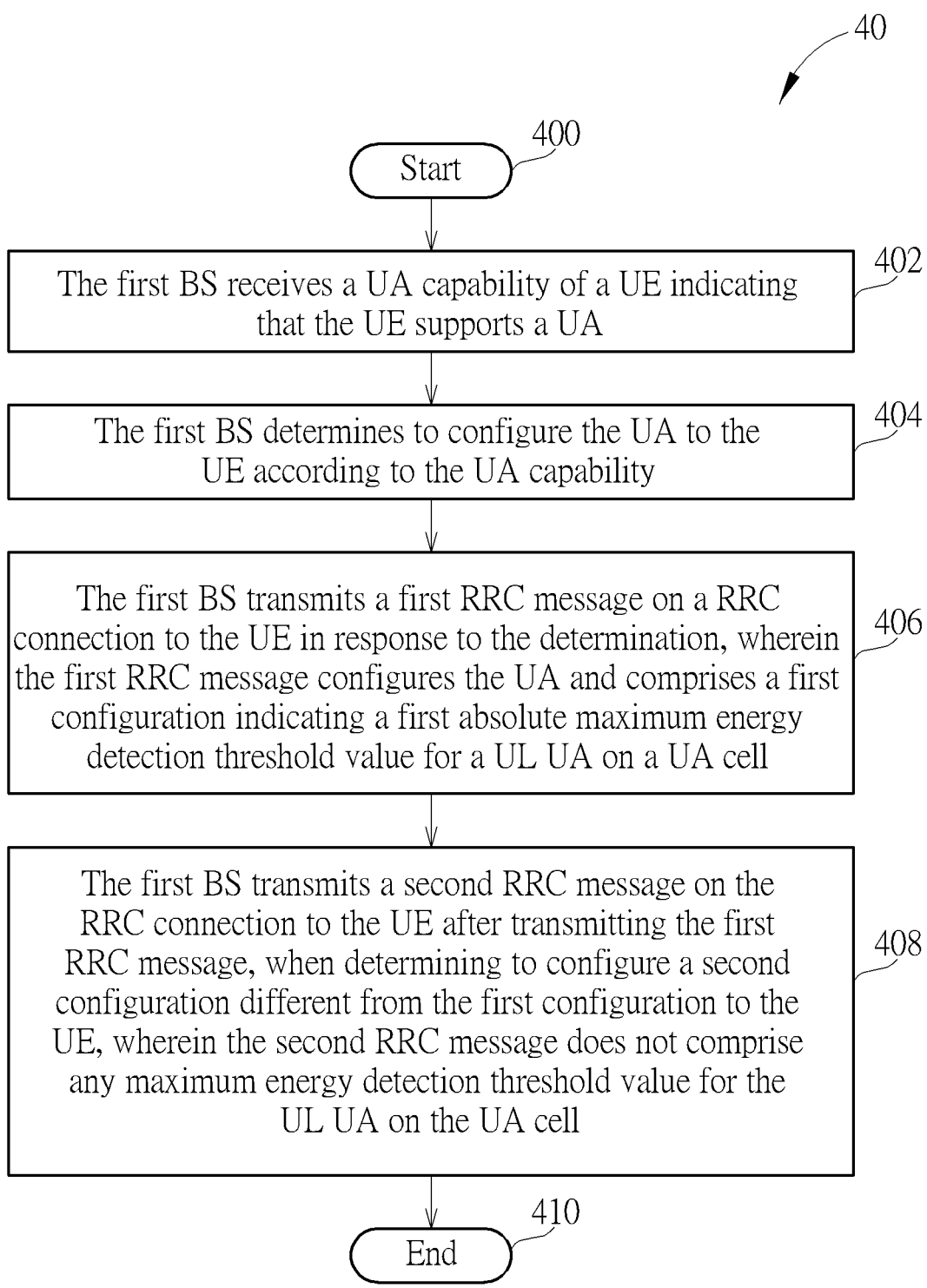
FIG. 4 is a flowchart of a process according to an example of the present invention.

Operations of the BS in the above description may be summarized into a process 40 in FIG. 4. The process 40 is utilized in a first BS, and includes the following steps:

Step 400: Start.

Step 402: The first BS receives a UA capability of a UE indicating that the UE supports a UA.

Step 404: The first BS determines to configure the UA to the UE according to the UA capability.

Step 406: The first BS transmits a first RRC message on a RRC connection to the UE in response to the determination, wherein the first RRC message configures the UA and comprises a first configuration indicating a first absolute maximum energy detection threshold value for a UL UA on a UA cell.

Step 408: The first BS transmits a second RRC message on the RRC connection to the UE after transmitting the first RRC message, when determining to configure a second configuration different from the first configuration to the UE, wherein the second RRC message does not comprise any maximum energy detection threshold value for the UL UA on the UA cell.

Step 410: End.

In one example, the first BS receives the UA capability from the UE, a second BS or a core network. The UE may obtain (or derive or calculate) measurement result(s) from measurements performed on an unlicensed carrier of the UA cell, and transmit the measurement result(s) of the unlicensed carrier on the RRC connection, or on a PCell or a licensed carrier to the first BS. The first BS determines to configure the UA to the UE according to the measurement result(s) received from the UE and the UA capability or to configure the UE to perform transmission(s) on the unlicensed carrier, when the measurement result(s) indicates that a signal strength or a quality of the unlicensed carrier is good (e.g., above a threshold).

In one example, the first BS transmits a third RRC message after transmitting the second RRC message, when determining to change the first absolute maximum energy detection threshold configured to the UE (e.g., to a second absolute maximum energy detection threshold value). The third RRC message may comprise a third configuration indicating the second absolute maximum energy detection threshold value.

In one example, the first BS may determine to change an energy detection threshold configured to the UE for a UA cell according to an energy level or an interference level detected/sensed by the first BS on an unlicensed carrier of the UA cell. For example, the first BS may determine (e.g., configure) the first energy detection threshold, when the energy level or the interference level is lower than or equal to a first threshold. The first BS may determine (e.g., configure) the second energy detection threshold, when the energy level or the interference level is higher than the first threshold or a second threshold. For example, the first BS may determine (e.g., configure) the first energy detection threshold, when the energy level or the interference level is in a first range. The first BS may determine (e.g., configure) the second energy detection threshold, when the energy level or the interference level is in a second range. In response to the determination, the first BS may transmit a RRC message indicating an absolute maximum energy detection threshold value or an offset to the default maximum energy detection threshold value to configure the determined energy detection threshold. The first BS may configure multiple energy detection thresholds for multiple UA cells configured to the UE for carrier aggregation. The multiple energy detection thresholds may be same or different according to energy levels or interference levels detected/sensed on unlicensed carriers of the multiple UA cells.

The first BS may transmit the first RRC message and the second RRC message to the UE via a PCell or a SCell.

Description for the process 30 may be applied to the process 40. Description for the process 40 may be applied to the process 30.

Realization of the processes 30-40 is not limited to the above description. Examples related to the channel access procedure are described as follows.

In one example, a transmission described above may be a random access preamble, a physical UL shared channel (PUSCH) transmission, a sounding reference signal (SRS), a physical UL control channel (PUCCH) transmission, a Hybrid Automatic Repeat Request (HARQ) acknowledgement, a HARQ negative acknowledgement, a channel state information or a channel quality indicator.

In one example, the above channel access procedure may be a Type 1 UL channel access procedure or a Type 2 UL channel access procedure configured by a UL grant or the RRC message described above. In one example, the RRC message described above may be a RRC reconfiguration message (e.g., RRC Connection Reconfiguration message), and the RRC response message may be a RRC reconfiguration complete message (e.g., RRC Connection Reconfiguration Complete message).

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a channel access procedure, comprising:
 a storage device; and
 a processing circuit, coupled to the storage device, wherein the storage device stores, and the processing circuit is configured to execute instructions of:
 receiving a first radio resource control (RRC) message on a RRC connection from a base station (BS), wherein the first RRC message comprises a first configuration indicating a first absolute maximum energy detection threshold value for an uplink unlicensed access (UA) on a UA cell;
 performing a first channel access procedure according to the first absolute maximum energy detection threshold value;
 receiving a second RRC message on the RRC connection from the BS, after receiving the first RRC message, wherein the second RRC message does not comprise any absolute maximum energy detection threshold value for the UL UA on the UA cell, and does not comprise an offset for any absolute maximum energy detection threshold value;
 performing a second channel access procedure according to the first absolute maximum energy detection threshold value, after receiving the second RRC message;
 receives a third RRC message from the BS or another BS on the RRC connection, after receiving the second RRC message, wherein the third RRC message comprises a third configuration indicating a second absolute maximum energy detection threshold value; and
 performing a third channel access procedure according to the second absolute maximum energy detection threshold value.

2. The communication device of claim 1, wherein the first RRC message configures the UL UA and comprises the first configuration, and the second RRC message comprises a second configuration different from the first configuration.

3. A first base station (BS) for handling a channel access procedure, comprising:
 a storage device; and
 a processing circuit, coupled to the storage device, wherein the storage device stores, and the processing circuit is configured to execute instructions of:
 receiving an unlicensed access (UA) capability of a communication device indicating that the communication device supports a UA;
 determining to configure the UA to the communication device according to the UA capability;
 transmitting a first RRC message on a radio resource control (RRC) connection to the communication device in response to the determination, wherein the first RRC message configures the UA and comprises a first configuration indicating a first absolute maximum energy detection threshold value for a UL UA on a UA cell;
 transmitting a second RRC message on the RRC connection to the communication device after transmitting the first RRC message, when determining to configure a second configuration different from the first configuration to the communication device, wherein the second RRC message does not comprise any maximum energy detection threshold value for the UL UA on the UA cell, and does not comprise an offset for any absolute maximum energy detection threshold value; and transmitting a third RRC message after transmitting the second RRC message, when determining to change the first absolute maximum energy detection threshold value configured to the communication device to a second absolute maximum energy detection threshold value, wherein the third RRC message comprises a third configuration indicating the second absolute maximum energy detection threshold value.

4. The first BS of claim 3, wherein the first BS receives the UA capability from the communication device, a second BS or a core network.

5. The first BS of claim 3, wherein the first BS determines to configure the UA to the communication device according to the UA capability and at least one measurement result of an unlicensed carrier received from the communication device.

6. The first BS of claim 3, wherein the instructions further comprise:
configuring the communication device to perform a transmission on an unlicensed carrier, when at least one measurement result of the unlicensed carrier received from the communication device indicates that a signaling strength or a quality of the unlicensed carrier is good.

7. The first BS of claim 3, wherein the first BS determines to change the first absolute maximum energy detection threshold value configured to the communication device according to an energy level detected by the BS on an unlicensed carrier.

8. The first BS of claim 3, wherein the first BS determines the first absolute maximum energy detection threshold value when the energy level is lower than or equal to a first threshold, and determines the second absolute maximum energy detection threshold value when the energy level is greater than a second threshold.

9. The first BS of claim 3, wherein the first BS determines the first absolute maximum energy detection threshold value when the energy level is in a first range, and determines the second absolute maximum energy detection threshold value when the energy level is in a second range.

10. A method for handling a channel access procedure of a communication device, comprising:
receiving a first radio resource control (RRC) message on a RRC connection from a base station (BS), wherein the first RRC message comprises a first configuration indicating a first absolute maximum energy detection threshold value for an uplink unlicensed access (UA) on a UA cell;
performing a first channel access procedure according to the first absolute maximum energy detection threshold value;
receiving a second RRC message on the RRC connection from the BS, after receiving the first RRC message, wherein the second RRC message does not comprise any absolute maximum energy detection threshold value for the UL UA on the UA cell, and does not comprise an offset for any absolute maximum energy detection threshold value;
performing a second channel access procedure according to the first absolute maximum energy detection threshold value, after receiving the second RRC message;
receives a third RRC message from the BS or another BS on the RRC connection, after receiving the second RRC message, wherein the third RRC message comprises a third configuration indicating a second absolute maximum energy detection threshold value; and
performing a third channel access procedure according to the second absolute maximum energy detection threshold value.

11. The method of claim 10, wherein the first RRC message configures the UL UA and comprises the first configuration, and the second RRC message comprises a second configuration different from the first configuration.

* * * * *